United States Patent
Kawaura et al.

(10) Patent No.: US 12,315,976 B2
(45) Date of Patent: May 27, 2025

(54) FUEL CELL SYSTEM

(71) Applicant: Honda Motor Co., Ltd., Tokyo (JP)

(72) Inventors: Takashi Kawaura, Saitama (JP); Takuya Miyata, Kanagawa (JP)

(73) Assignee: Honda Motor Co., Ltd., Tokyo (JP)

( * ) Notice: Subject to any disclaimer, the term of this patent is extended or adjusted under 35 U.S.C. 154(b) by 481 days.

(21) Appl. No.: 17/903,037

(22) Filed: Sep. 5, 2022

(65) Prior Publication Data

US 2023/0098470 A1 Mar. 30, 2023

(30) Foreign Application Priority Data

Sep. 24, 2021 (CN) .......................... 202122315336.5

(51) Int. Cl.
*H01M 8/2465* (2016.01)
*H01M 8/04298* (2016.01)

(52) U.S. Cl.
CPC ..... *H01M 8/2465* (2013.01); *H01M 8/04298* (2013.01); *H01M 2250/20* (2013.01)

(58) Field of Classification Search
CPC ........... H01M 8/2465; H01M 8/04298; H01M 2250/20
USPC ........................................................ 429/428
See application file for complete search history.

(56) References Cited

U.S. PATENT DOCUMENTS

| 2014/0113161 A1* | 4/2014 | Katano | ................... B60L 1/003 429/9 |
| 2018/0257490 A1* | 9/2018 | Imanishi | ........... H01M 8/04947 |

FOREIGN PATENT DOCUMENTS

JP 2020082753 6/2020

* cited by examiner

*Primary Examiner* — James M Erwin
(74) *Attorney, Agent, or Firm* — JCIPRNET

(57) ABSTRACT

A fuel cell system in which a controller unit is prevented from being disassembled in an unconventional manner. The fuel cell system includes a fuel cell stack configured to generate electricity; a cable; a controller unit connected to the full cell stack through the cable to control the fuel cell system; a connector configured to connect the controller unit to the cable, where the connector has an insertion portion, and the insertion portion is inserted into the controller unit; a protector fixed onto the controller unit to protect the controller unit; and a bracket supporting the protector. The bracket has a cable support portion, and the cable support portion is configured to support the cable. A displaceable distance of the cable between the connector and the cable support portion is less than a length of the insertion portion.

2 Claims, 7 Drawing Sheets

FUEL CELL SYSTEM

CROSS-REFERENCE TO RELATED APPLICATION

This application claims the priority benefit of China application no. 202122315336.5, filed on Sep. 24, 2021. The entirety of the above-mentioned patent application is hereby incorporated by reference herein and made a part of this specification.

BACKGROUND

Technical Field

The disclosure relates to a cell system, and in particular, relates to a fuel cell system.

Description of Related Art

In recent years, efforts to build safe cities and human settlements have been stepped up in all countries, with an aim to strengthen capacities for inclusive and sustainable urban development as well as planning management of sustainable human settlements in all countries. Therefore, in all countries, not only safe, affordable, accessible, and sustainable transportation systems are required to be available to all people, but road safety also needs to be improved, especially the expansion of public transportation because special attention needs to be put to people in vulnerable conditions such as women, children, people with disabilities and the elderly. In the transportation sector, there is an urgent need to take steps to address environmental concerns in order to develop technologies that can be used to improve the convenience and safety of public transportation.

In a vehicle fuel cell system, the controller unit is typically connected to the fuel cell stack through a cable. With the development of autonomous driving technology, the control program of the controller unit has a greater impact on the safety of the vehicle while driving. If the controller unit is too easy to be disassembled and its control program is rewritten, it will cause road safety concerns. Therefore, it is necessary to adjust the way the controller unit is installed, so as to prevent the controller unit from being disassembled too easily.

RELATED ART LITERATURE

Patent Literature

[Patent Literature 1] Japanese Patent Publication No. 2020-082753

SUMMARY

The disclosure provides a fuel cell system in which a controller unit is prevented from being disassembled in an unconventional manner.

The disclosure provides a fuel cell system including a fuel cell stack, a cable, a controller unit, a connector, a protector, and a bracket. The fuel cell stack is configured to generate electricity. The controller unit is connected to the full cell stack through the cable to control the fuel cell system. The connector is configured to connect the controller unit to the cable. The connector has an insertion portion, and the insertion portion is inserted into the controller unit. The protector is fixed onto the controller unit to protect the controller unit. The bracket supports the protector. The bracket has a cable support portion, and the cable support portion is configured to support the cable. A displaceable distance of the cable between the connector and the cable support portion is less than a length of the insertion portion.

In an embodiment of the disclosure, the cable support portion is installed at a position covered by the protector.

To sum up, in the fuel cell system provided by the disclosure, the displaceable distance of the section of the cable extending between the connector and the cable support portion is set to be less than the length of the insertion portion of the connector. In this way, when an attempt is made to directly pull out the insertion portion of the connector from the controller unit, since the movable distance of the insertion portion is limited by the cable, the insertion portion cannot be completely separated from the controller unit and is difficult to be pulled out. Therefore, in the fuel cell system provided by the disclosure, the controller unit is prevented from being disassembled in an unconventional manner.

In order to make the aforementioned and other features and advantages of the disclosure more comprehensible, several embodiments accompanied with figures are described in detail below.

DESCRIPTION OF THE EMBODIMENTS

Figure 1:
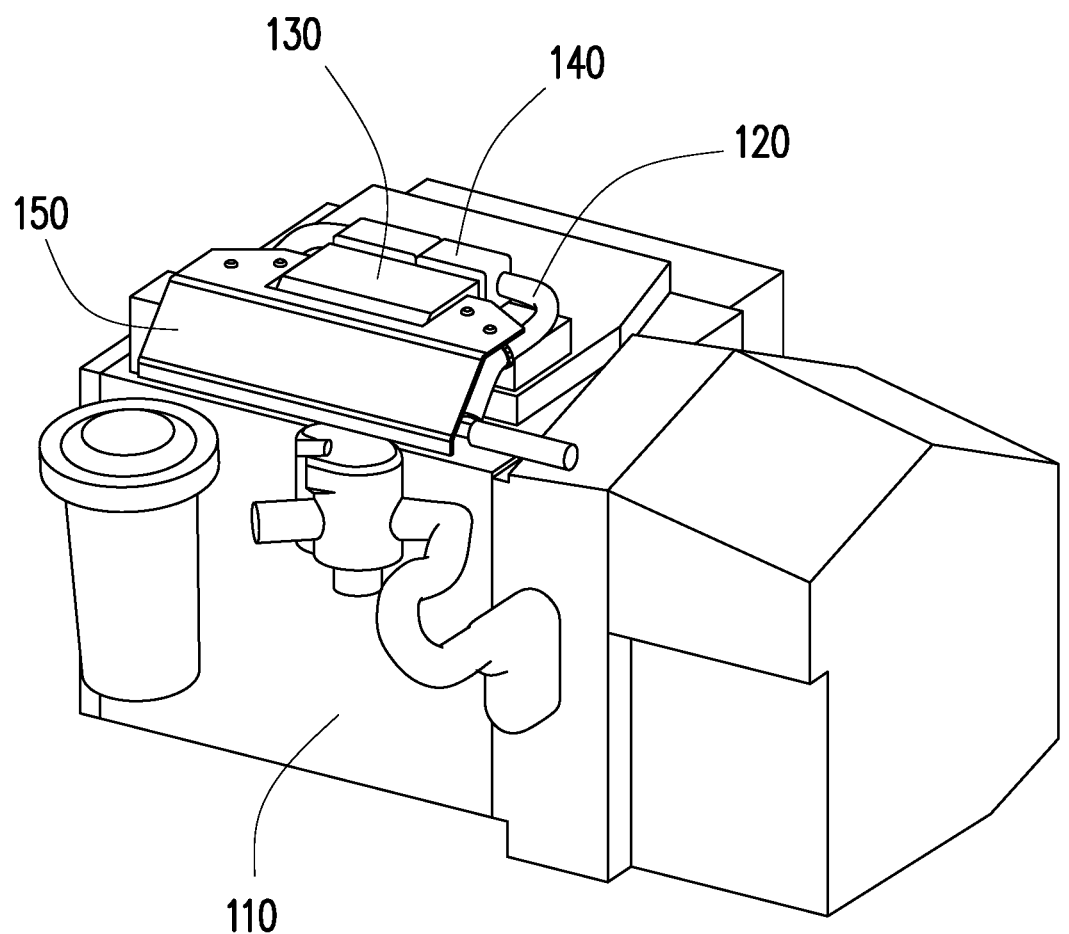
FIG. 1 is a three-dimensional view of a fuel cell system according to an embodiment of the disclosure.

FIG. 1 is a three-dimensional view of a fuel cell system according to an embodiment of the disclosure. With reference to FIG. 1, a fuel cell system 100 provided by this embodiment is, for example, a fuel cell system for a vehicle and includes a fuel cell stack 110, a cable 120, a controller unit 130, a connector 140, and a protector 150. The fuel cell stack 110 configured to generate electricity. The controller unit 130 is connected to the full cell stack 110 through the cable 120 to control the fuel cell system 100. For simplicity and clarity of the drawings, the cable 120 is only partially shown in FIG. 1 and subsequent figures. The connector 140 is configured to connect the controller unit 130 to the cable 120. The protector 150 is, for example, a bent plate, which is fixed onto the controller unit 130 to protect the controller unit 130.

Figure 2:
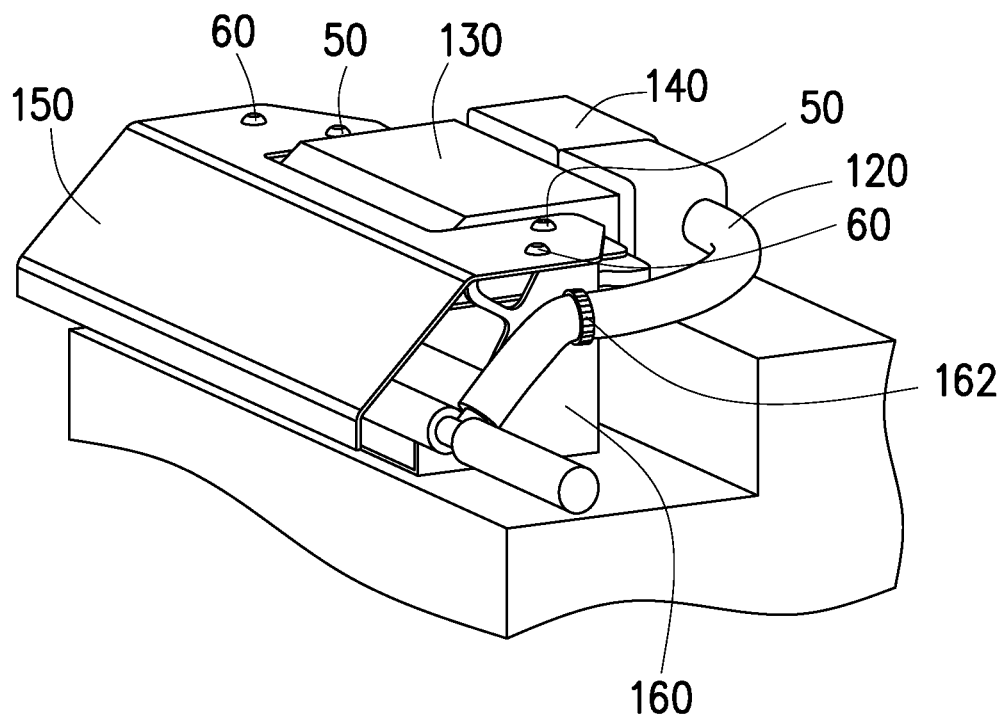
FIG. 2 is a partial three-dimensional view of the fuel cell system of FIG. 1.
Figure 3:
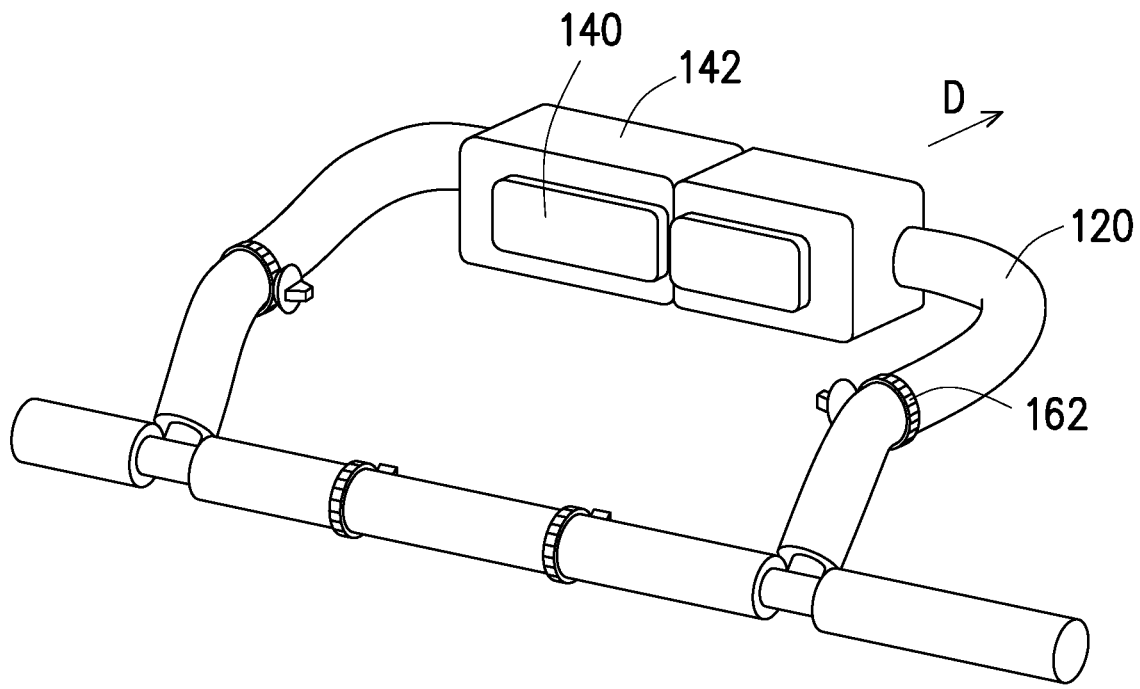
FIG. 3 is a three-dimensional view of a connector and a cable of FIG. 2.

FIG. 2 is a partial three-dimensional view of the fuel cell system of FIG. 1. FIG. 3 is a three-dimensional view of a connector and a cable of FIG. 2. The fuel cell system 100 also includes a bracket 160 as shown in FIG. 2, and the bracket 160 is fixed on the fuel cell stack 110 and is configured to support the protector 150. The connector 140 has an insertion portion 142 as shown in FIG. 3, and the insertion portion 142 is inserted into the controller unit 130. The bracket 160 has a cable support portion 162, and the cable support portion 162 is configured to support the cable 120. A displaceable distance of the cable 120 between the connector 140 and the cable support portion 162 is less than a length of the insertion portion 142. In this embodiment, the cable support portion 162 may include a sleeving ring connected to the main body of the bracket 160 and fixes the cable 120 in a sleeved manner. In other embodiments, the cable support portion 162 may be other suitable forms of components, which are not limited by the disclosure.

As described above, the displaceable distance of the section of the cable 120 extending between the connector 140 and the cable support portion 162 is set to be less than the length of the insertion portion 142 of the connector 140. In this way, when an attempt is made to directly pull out the insertion portion 142 of the connector 140 from the controller unit 130, since the movable distance of the insertion portion 142 is limited by the cable 120, the insertion portion 142 cannot be completely separated from the controller unit 130 and is difficult to be pulled out. Accordingly, the removal of the controller unit 130 in an unconventional manner may be prevented from occurring, so that the control program of the controller unit 130 may be prevented from being rewritten to cause driving safety problems.

Figure 4:
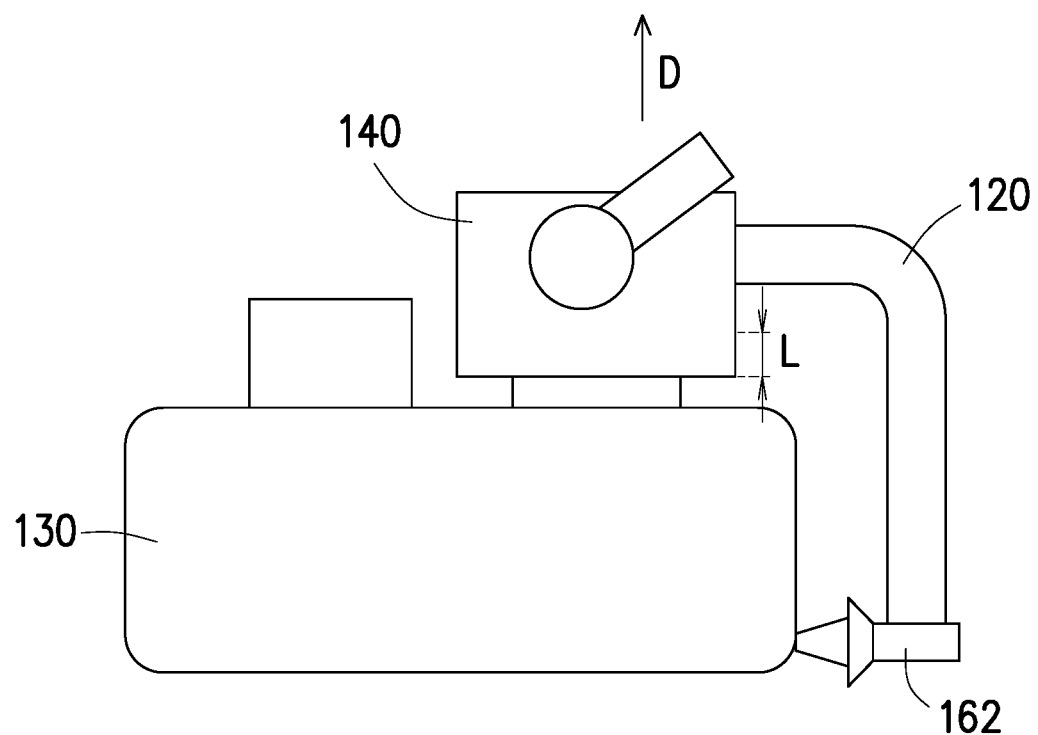
FIG. 4 a schematic top view of some components of the fuel cell system of FIG. 2.

FIG. 4 a schematic top view of some components of the fuel cell system of FIG. 2. In order to simplify the drawing, the shapes of the components in FIG. 4 are only schematic. To be specific, when the connector 140 and the controller unit 130 are inserted into each other, as shown in FIG. 4, an insertion depth L (substantially the same as the length of the insertion portion 142 in a direction D shown in FIG. 3, for example) is provided. By limiting the length of the section of the cable 120 between the connector 140 and the cable support portion 162, the distance that the connector 140 can move in the direction D relative to the controller unit 130 is limited by the cable 120 to be less than the insertion depth L. The connector 140 may thereby be prevented from being pulled out directly from the controller unit 130.

Figure 5A:
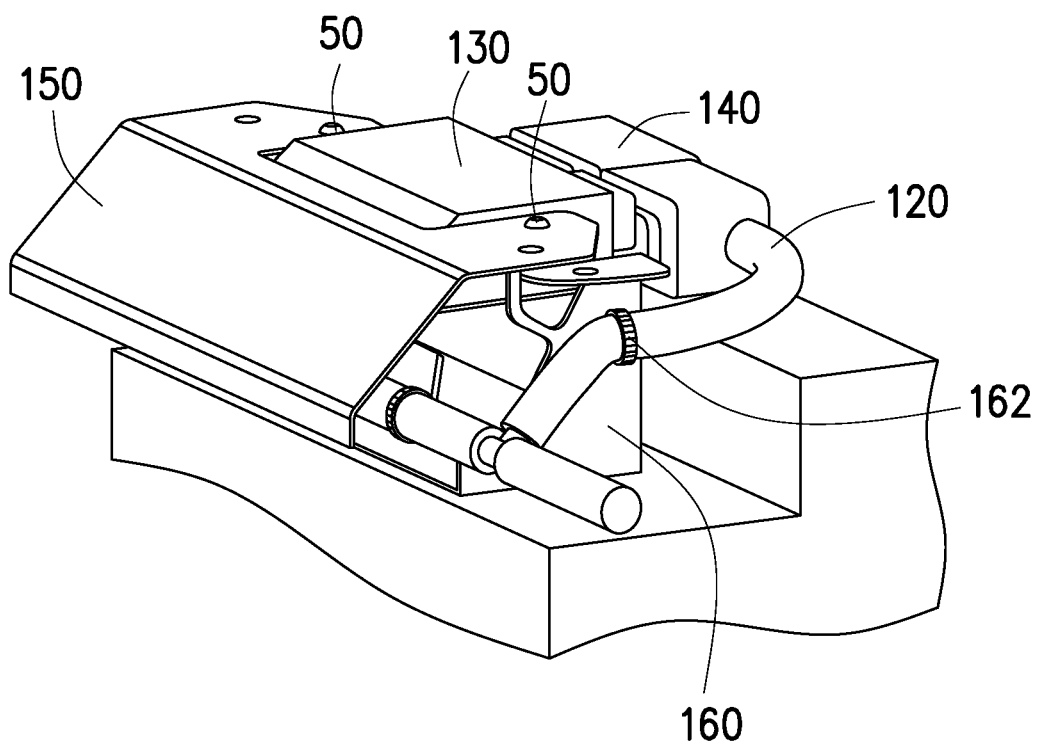
FIG. 5A to FIG. 5C illustrate an assembly process of a controller unit of FIG. 3.
Figure 5B:
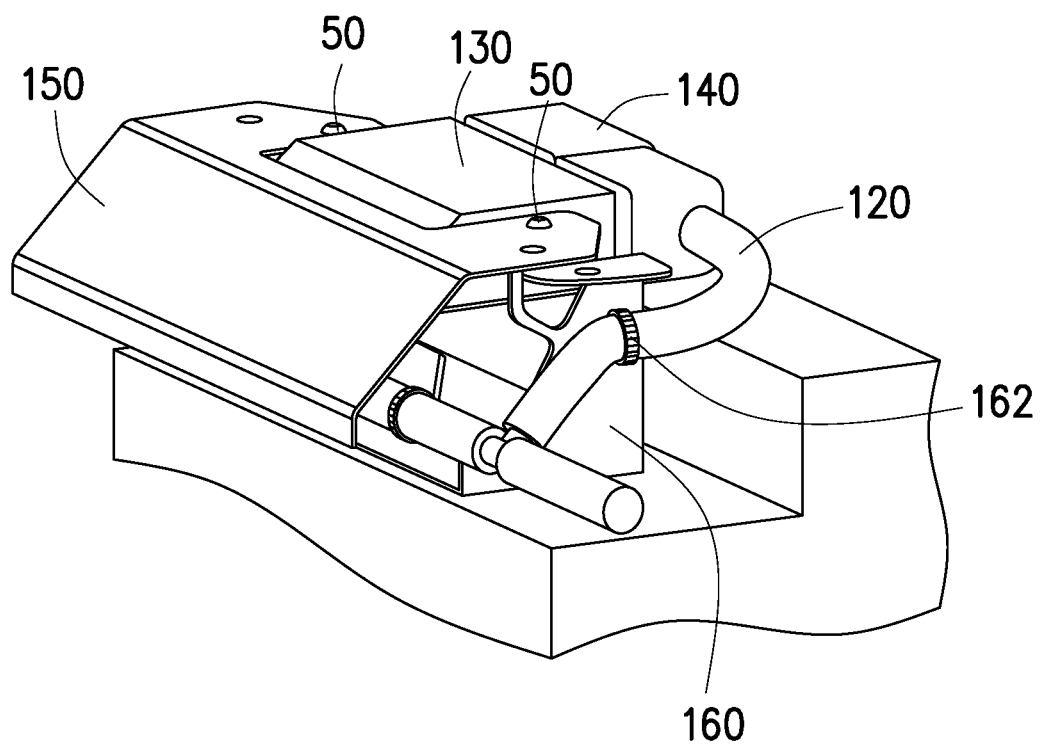
Figure 5C:
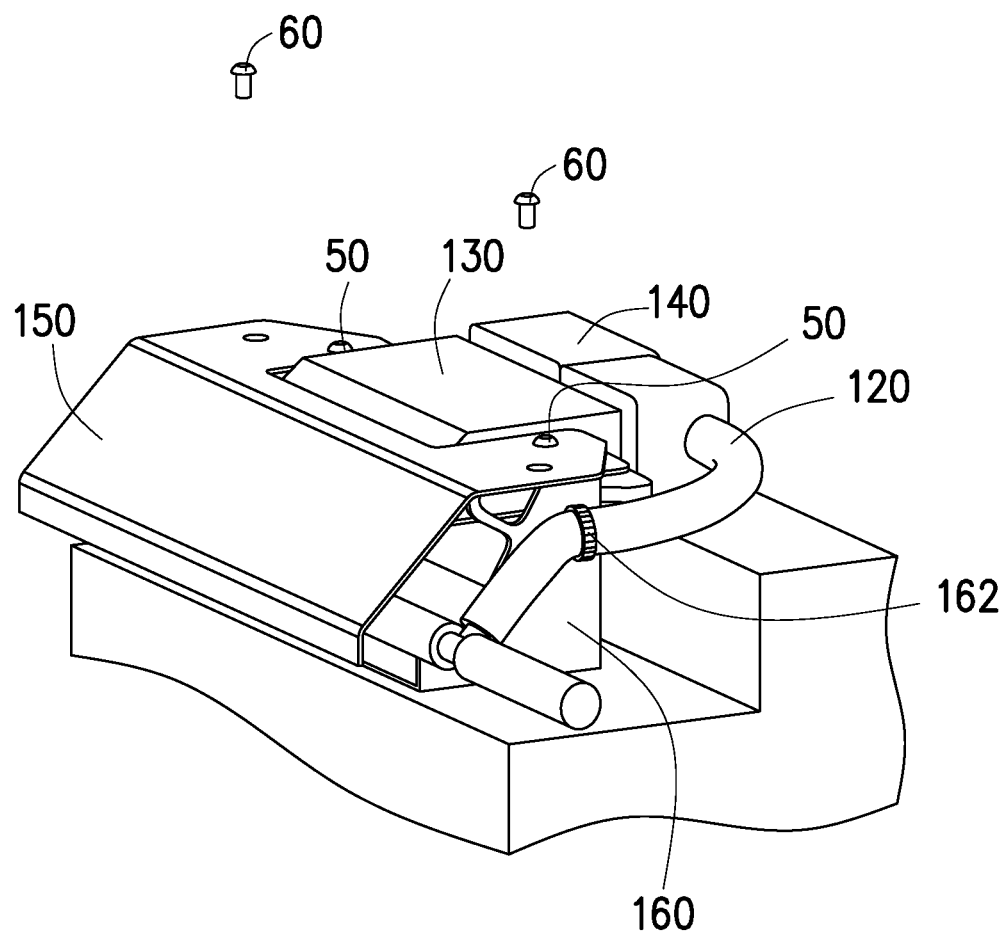

The assembly of the controller unit 130 of this embodiment is to be described below. FIG. 5A to FIG. 5C illustrate an assembly process of a controller unit of FIG. 3. First, the protector 150 is combined with the controller unit 130 through locking members 50 as shown in FIG. 5A. The cable 140 is fixed to the cable support portion 162 of the bracket 160, so that the length of the section of the cable 120 between the connector 140 and the cable support portion 162 is limited as described above, and the protector 150 is not combined with the bracket 160 for the time being. Since the protector 150 has not been combined with the bracket 160, the protector 150 and the controller unit 130 may move freely. Therefore, even if the length of the cable 120 is limited, the connector 140 connected to the cable 120 can still be inserted into the controller unit 130 as shown in FIG. 5B. Next, the protector 150 is overlapped on the bracket 160, and the protector 150 is combined with the bracket 160 through locking members 60 as shown in FIG. 5C, and the assembled state shown in FIG. 2 is obtained.

As such, the controller unit 130 is required to be disassembled by conventional means. That is, as shown in FIG. 5C, the locking members 60 are removed first to release the locking relationship between the protector 150 and the bracket 160. Next, the protector 150, the controller unit 130, and the connector 140 are moved together, so that the connector 140 is closer to the position of the cable support portion 162 as shown in FIG. 5B, and then the connector 140 can be smoothly pulled out from the controller unit 130.

In this embodiment, one bracket 160 shown in FIG. 2 is interlocked with the protector 150 through one locking member 60. It can be understood that in the position below the other locking member 60 that is shielded by the protector 150, another bracket is provided, which is interlocked with the protector 150 through the other locking member 60. It can be understood that the arrangement of the another bracket is substantially the same as that of the bracket 160 shown in FIG. 2. In other embodiments, the number of brackets can be changed, and a plurality of brackets can be integrated, which is not limited by the disclosure. Further, in this embodiment, the cable support portion 162 is installed at a position covered by the protector 150, for example. That is, as shown in FIG. 2, the cable support portion 162 is located below the protector 150 and is covered by the protector 150. In this way, unless the protector 150 is detached, the cable support portion 162 is difficult to be disassembled. As such, the cable support portion 162 cannot be disassembled in an unconventional manner, it is thereby ensured that the length of the section of the cable 120 between the connector 140 and the cable support portion 162 is limited as described above, and the connector 140 is prevented from being directly pulled out from the controller unit 130.

As described above, in the fuel cell system provided by the disclosure, the displaceable distance of the section of the cable extending between the connector and the cable support portion is set to be less than the length of the insertion portion of the connector. In this way, when an attempt is made to directly pull out the insertion portion of the connector from the controller unit, since the movable distance of the insertion portion is limited by the cable, the insertion portion cannot be completely separated from the controller unit and is difficult to be pulled out. Therefore, in the fuel cell system provided by the disclosure, the controller unit is prevented from being disassembled in an unconventional manner.

Finally, it is worth noting that the foregoing embodiments are merely described to illustrate the technical solutions of the disclosure and should not be construed as limitations of the disclosure. Even though the foregoing embodiments are referenced to provide detailed description of the disclosure, a person having ordinary skill in the art should understand that various modifications and variations can be made to the technical solutions in the disclosed embodiments, or equivalent replacements may be made for part or all of the technical features. Nevertheless, it is intended that the modifications, variations, and replacements shall not make the nature of the technical solutions to depart from the scope of the technical solutions of the embodiments of the disclosure.

What is claimed is:

1. A fuel cell system, comprising:
   a fuel cell stack, configured to generate electricity;
   a cable;
   a controller unit, connected to the full cell stack through the cable to control the fuel cell system;
   a connector, configured to connect the controller unit to the cable, wherein the connector has an insertion portion, and the insertion portion is inserted into the controller unit;
   a protector, fixed onto the controller unit to protect the controller unit; and
   a bracket, supporting the protector, wherein the bracket has a cable support portion, the cable support portion is configured to support the cable, and a displaceable distance of the cable between the connector and the cable support portion is less than a length of the insertion portion.

2. The fuel cell system according to claim 1, wherein the cable support portion is installed at a position covered by the protector.

* * * * *